United States Patent [19]

Champiau et al.

[11] 3,936,802
[45] Feb. 3, 1976

[54] CONTROL DEVICE FOR RECORDING ELEMENTS

[75] Inventors: Robert Francois Champiau; André Achille Brecy, both of Belfort, France

[73] Assignee: Societe Industrielle Honeywell Bull, Paris, France

[22] Filed: Sept. 5, 1972

[21] Appl. No.: 286,513

[52] U.S. Cl. .............................. 340/172.5; 101/93
[51] Int. Cl.[2] ..... G06F 3/08; G06F 3/12; G06F 7/04
[58] Field of Search ............ 340/172.5, 146.2; 101/93 C, 93.09–93.11, 93.13–93.14, 93.28–93.34, 93.48; 235/92 CA, 92 EA, 61.7 R

[56] References Cited
UNITED STATES PATENTS

| | | | |
|---|---|---|---|
| 2,776,618 | 1/1957 | Hartley | 101/93 |
| 2,915,967 | 12/1959 | Gehring et al. | 101/93 |
| 3,198,351 | 8/1965 | Paglee | 340/172.5 |
| 3,351,917 | 11/1967 | Shimabukuro | 340/172.5 |
| 3,430,210 | 2/1969 | Foure et al. | 340/172.5 |
| 3,561,354 | 2/1971 | Mrkvicka | 101/93 |
| 3,651,481 | 3/1972 | Evans et al. | 340/172.5 |
| 3,656,427 | 4/1972 | Foley | 101/93.29 |
| 3,662,340 | 5/1972 | Spencer | 340/146.2 |
| 3,672,297 | 6/1972 | Berglund et al. | 101/93.09 |
| 3,710,936 | 1/1973 | Mizunuma | 235/61.7 R X |
| 3,725,867 | 4/1973 | Jordan | 340/172.5 |
| 3,736,868 | 6/1973 | Briggs | 101/93.29 |
| 3,770,945 | 11/1973 | Dlugos et al. | 235/92 EA |
| 3,795,186 | 3/1974 | Curtiss et al. | 101/93.14 |

OTHER PUBLICATIONS

IBM Technical Disclosure Bulletin, "Multiline Printer", W. Hoffman, Vol. 2/No. 6, April 1960.

*Primary Examiner*—Gareth D. Shaw
*Assistant Examiner*—Jan E. Rhoads
*Attorney, Agent, or Firm*—Diller, Brown, Ramik & Wight

[57] ABSTRACT

A control device for n recording elements for data which are part of a given plurality of data which can be recorded by each of said elements.

This device is made up of n identical control circuits connected respectively to the recording elements, each of said circuits including:— a first memory for storing, consecutively, the coded data that can be entered in an order determined by the recording element affiliated with the control circuit — a second memory for storing coded data to be recorded by said element — a comparator connected to said two memories and controlled by an enabling circuit connected to a time base and to the recording element to cause the timely recording of the data recognized by comparison.

10 Claims, 7 Drawing Figures

| SC | M1 | | K | | | M2 | | K | | | M10 | | K | | |
|---|---|---|---|---|---|---|---|---|---|---|---|---|---|---|---|
| | | T1 | T2 | T3 | | T1 | T2 | T3 | | T1 | T2 | T3 |
| 1 | 0 | 0 | 1 | 2 | 16 | 13 | 14 | 15 | 144 | 117 | 118 | 119 |
| 4 | 1 | 1 | 2 | 3 | 17 | 14 | 15 | 16 | 145 | 118 | 119 | 120 |
| 7 | 2 | 2 | 3 | 4 | 18 | 15 | 16 | 17 | 146 | 119 | 120 | 121 |
| 10 | 3 | 3 | 4 | 5 | 19 | 16 | 17 | 18 | 147 | 120 | 121 | 122 |
| 13 | 4 | 4 | 5 | 6 | 20 | 17 | 18 | 19 | 148 | 121 | 122 | 123 |
| 16 | 5 | 5 | 6 | 7 | 21 | 18 | 19 | 20 | 149 | 122 | 123 | 124 |
| 3 | 6 | 5 | 6 | 7 | 22 | 18 | 19 | 20 | 150 | 122 | 123 | 124 |
| 6 | 7 | 6 | 7 | 8 | 23 | 19 | 20 | 21 | 151 | 123 | 124 | 125 |
| 9 | 8 | 7 | 8 | 9 | 24 | 20 | 21 | 22 | 152 | 124 | 125 | 126 |
| 12 | 9 | 8 | 9 | — | 25 | 21 | 22 | — | 153 | 125 | 126 | — |
| 15 | 10 | 9 | 10 | — | 26 | 22 | 23 | — | 154 | 126 | 127 | — |
| 2 | 11 | 10 | 11 | — | 27 | 22 | 23 | — | 155 | 126 | 127 | — |
| 5 | 12 | 11 | 12 | — | 28 | 23 | 24 | — | 156 | 127 | 128 | — |
| 8 | 13 | 12 | 13 | — | 29 | 24 | 25 | — | 157 | 128 | 129 | — |
| 11 | 14 | — | — | — | 30 | 25 | 26 | — | 158 | 129 | 130 | — |
| 14 | 15 | — | — | — | 31 | 26 | 27 | 28 | 159 | 130 | 131 | 132 |

FIG. 3

CONTROL DEVICE FOR RECORDING ELEMENTS

BACKGROUND OF THE INVENTION

The present invention is concerned with a control device for recording elements for data which are part of a given aggregate of data recordable by each of these elements.

It is known that for the purpose of fast recording it is useful to have apparatus available which comprises a large number of recording elements, controlled consecutively or simultaneously. One of the methods, generally in use, for the control of such recording apparatus is to compare the data to be recorded with the data which the elements are capable of recording at given instants. The control devices of these recording apparatus perform comparisons between, on the one hand, coded data to be recorded and, on the other hand, coded data which is able to be recorded. When two data of these aggregates are identical, the control device sends a signal to the recording element which is to carry out the recording. One type of recording apparatus controlled by devices of this type which may be mentioned, for example, are printing machines connected to computers, such as the so called "on-the-fly" printers. This term refers to the fact that the impression is performed by the striking of hammers on characters that have a mobile support. In the case of wheel printers, the support consists of several identical sets of characters arranged in circles round the wheel. In the case of printers with a linear support the identical sets follow each other consecutively. In spite of comparable performances, from the viewpoint of speed of impression, the use of printers with a linear support is often preferred because of the quality of the impression through the affiliated control device is more complex. In the wheel printers the different sets of characters may be placed in such a manner that the same repeated character may at a given moment be positioned opposite any hammer. This is not so in the case of the printers with a linear support where, irrespective of the arrangement of the characters on the support, an order of character sequence occurs in front of the hammers which depends on the respective positions of the latter. This case results in a greater complexity of the control device, basically due to the important role of the storage media for the coded characters which each of the hammers may hit as a function of the time and of the address curcuit which is connected with these storage media.

These media usually consist of a memory of relatively large capacity since it must contain all the sequences of coded characters that each hammer may strike during the imprint of a line on paper. Each of the coded characters of each of these sequences must be compared with the data to be printed coded in the same manner. This explains, on the one hand, why the construction of such a control device is sensitive and cumbersome, and on the other hand, why its operation is limited as far as speed is concerned.

One of the objects of the present invention is the simplification of the storage media for recordable data by each of the recording elements as well as simplification of the media of storage for the data to be recorded.

SUMMARY OF THE INVENTION

According to the invention the control device for n recording elements for data being part of a given aggregate of data recordable by each of these elements, operating by comparison of the data to be recorded with the data contained in this aggregate, is characterized by consisting of n identical control circuits connected with the recording elements respectively. Each of these circuits comprises:

a first memory which consecutively stores the data coded, recordable in a predetermined order by the recording element affiliated with the control circuit;

a second memory storing the data, coded, to be recorded by said element; and a comparator connected with the preceding two memories, controlled by an enabling circuit tied to a time base. The comparator is linked to the recording element for the command, at any desired moment, of the recording of the data identified by comparison.

BRIEF DESCRIPTION OF THE DRAWING

Other properties and advantages of the invention will become apparent from the following description of an application, typical for a chain printer, presented as a non-limiting example, with reference to attached drawing, wherein;

FIG. 3 is a partial table of coincidence of characters with the hammers in a chain printer at the instants of their striking;

DESCRIPTION OF THE PREFERRED EMBODIMENT

Figure 1:
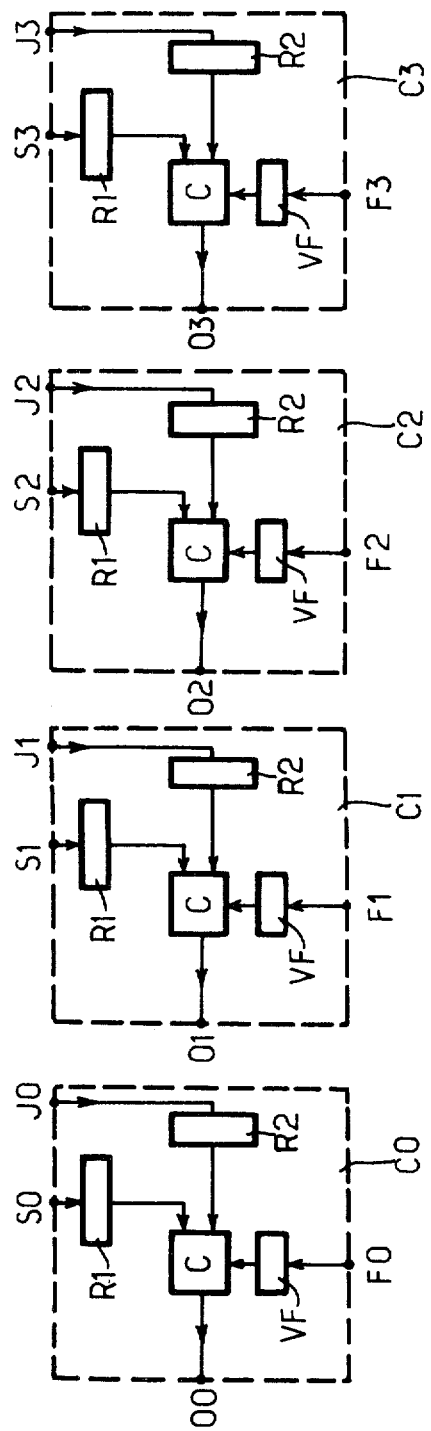
FIG. 1 is a schematic diagram of the control circuits associated with each recording element.

The control circuits C0, C1, C2 and C3, illustrated in FIG. 1 each include a first memory R1 and a second memory R2 whose outputs are linked with two inputs of a comparator C, respectively, the third input of the latter being connected with an enabling circuit VF for comparison. The memories R1 and R2 are so designed as to receive one data only, at the time. The comparator is so designed as to compare two data, originating from the memories R1 and R2, respectively, only when a signal is transmitted to it by the circuit VF, and to emit only one signal in the output when the two identical data have been compared.

The recording elements are tied to the control circuits C0, C1, C2 and C3 by connections of the comparator C outputs at the terminals 00, 01, 02 and 03, respectively. The coded data, recordable by a recording element in a predetermined order, are transmitted consecutively by the terminals S0, S1, S2 and S3 to the input of the memories R1 of the circuits C0, C1, C2 and C3, respectively. The coded data to be recorded by a recorded element is transmitted by the terminals J0, J1, J2 and J3 to the input of the memories R2 of the circuits C0, C1, C2, and C3 respectively. Control signals originating from a time base are transmitted by the terminals F0, F1, F2 and F3 to the inputs of the enabling circuits VF of the circuits C0, C1, C2 and C3, respectively. Thus, the recording control by any one of the recording elements of a given data sent to the memory R2 is only the function of the position of that data in relation to the order of recordable data sent consecutively to the memory R1, and of the instants of the recording validation, tied to instants of recording authorization, defined by the signals sent to the enabling circuit VF. It (the recording control) does not depend on the circuit design, which has the role of a passive element.

It is of interest to examine the case in which the data to be recorded by the group of n recording elements stem consecutively from the same source, and where the order of sequence of the recordable data by each of these elements is the same. This case applies to chain printers.

Figure 2:
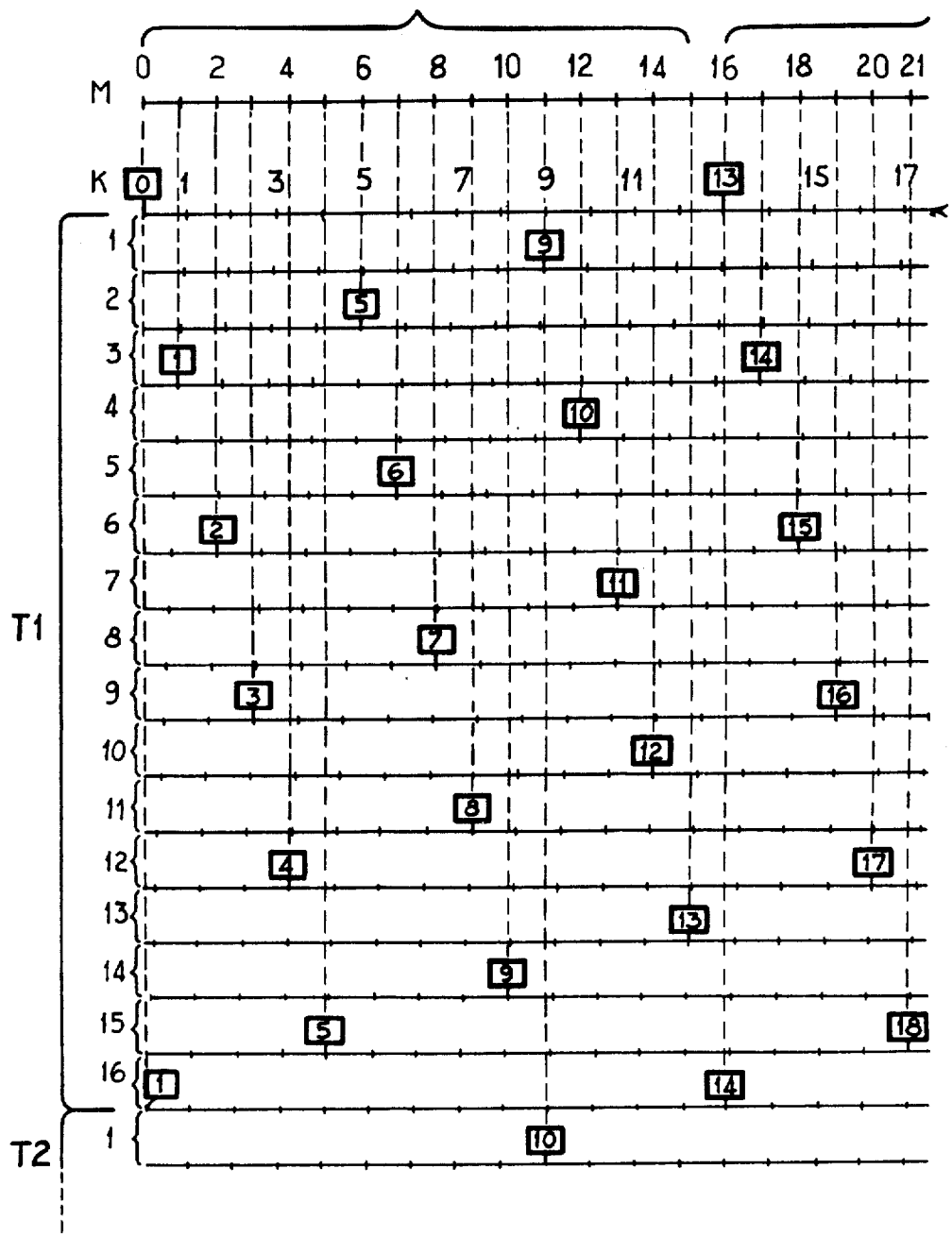
FIG. 2 is a partial schematic illustration of the respective positions of the characters on the moving chain of a printer relative to the row of hammers.

The following description then refers especially to a chain printer which comprises 10 sets of 16 hammers M, arranged in regular intervals, and 10 sets of 48 characters K, arranged at regular intervals, on a chain in such a way that when the first hammer coincides at a given instant with the character of row 0, as in FIG. 2, the hammer 16 (the first hammer of the second row) coincides with the character of row 13, the hammer 32 with the character of row 26, etc. Since the chain passes in front of the hammers with constant speed, the designation "cycle" is given to the period separating the coincidences of two characters which follow on the chain with the same hammer as in FIG. 2, the characters in squares of rows 0 and 1 with the hammer 0, during the cycle T1. Subcycles may, therefore, be defined as time intervals between two consecutive strikes of two hammers, in number equal to the hammers of a set, corresponding with the different coincidences of the hammers of a set with certain characters. FIG. 2 exhibits all coincidences evolving in the course of a cycle T1 from the moment in which the character of row 0 faces the hammer 0. The number of the characters in coincidence with hammers are in squares, the numbers of the sub-cycles are marked in front of double curved brackets. At the start of the first sub-cycle the character 0 faces the hammer 0, at the start of the second sub-cycle the character 9 faces the hammer 11, at the beginning of the third sub-cycle the character 5 faces the hammer 6, etc. One sees that, on the one hand, all the characters from 0 to 13 face one of the hammers of the first set at least once during the cycle T1, and on the other hand, that the character 5 faces the hammers 6 and 5 consecutively and that the character 9 faces the hammers 11 and 10 consecutively. One should also realize that the order of position of the characters on the chain does not correspond with the order of sequence of the sub-cycles where the coincidences occur.

FIG. 3 is a table of the numerical order of the hammers of the first, second, and tenth set M1, M2, M10, arranged in the order of their respective positions, and the numerical order of the characters in coincidence K at the beginning of each sub-cycle SC of the first, the second and the third cycles T1, T2, and T3.

This table is to be interpreted in the following manner. At the beginning of each first sub-cycle of the cycles T1, T2, T3, etc. the hammer 0 may consecutively strike the characters 0, 1, 2, etc; at the beginning of the fourth sub-cycle of the same cycles the hammer 1 may consecutively strike the characters of rows 1, 2, 3, etc; at the beginning of the seventh sub-cycles of the same cycle the hammer 2 may sequentially strike the characters of rows 2, 3, 4, etc; the first hammer 16 of the second set may consecutively strike at the same time as the first hammer 0 of the first set, the characters 13, 14, 15, etc; the first hammer 144 of the tenth set may also consecutively strike, at the beginning of the first sub-cycle, the characters of the rows 117, 118, 119, etc. Thus, each beginning of a sub-cycle of the sequence of cycles corresponds with a simultaneous striking of the hammers of the same order in the 10 sets. Hence there are, at the beginning of each of the 16 sub-cycles of a cycle, 10 possible simultaneous strikes of the hammers of the same order in the 10 sets and, in the course of a cycle, 16 series of 10 simultaneous strikes; that is, 160 strikes corresponding with the total of strikes of one character by each of the hammers of the 10 sets. To print a line on paper it is required that each hammer be able to strike one of the 48 different characters of one of the 10 identical sets; that is, 48 cycles or 768 sub-cycles at the maximum.

It will be noted that according to the table in FIG. 3, in the course of a cycle, the characters in coincidence with the hammers are in the same order as the hammers except for displacements due to the repeated coincidences of certain characters with two consecutive hammers. The same applies to the characters of rows 0, 1, 2, 3, 4, 5, 5, 6, 7, 8, 9, 9, 10, 11, 12, 13 which coincide with the hammers 0, 1, 2, 3, 4, 5, 6, 7, 8, 9, 10, 11, 12, 13, 14, 15, respectively. This shows that, on the one hand, in the sequence of cycles the coincidences of the characters correspond with a hammer in the order of their sequence on the chain as well as the coincidences of the characters 13, 14, 15, etc., with the hammer 16, and on the other hand, when one passes from one hammer to the following a transfer of one range of characters in coincidence to another range consisting of the same characters takes place, with the exception of the first which is at the end, for if one passes from one set to the following one the characters repeat themselves. This, for instance, applies to the hammers 0 and 1 where one passes from the range of characters 0, 1, 2, 3, etc. to the range 1, 2, 3, 4, etc. Therefore, each of the hammers may strike as many characters in their order of a sequence as there are cycles during a succession of given cycles, the sequences being identical, except for the shift of a set of character numbers when one passes from one hammer to the next, and when the repeated coincidences of certain characters with two consecutive hammers are taken into account.

Figure 4:
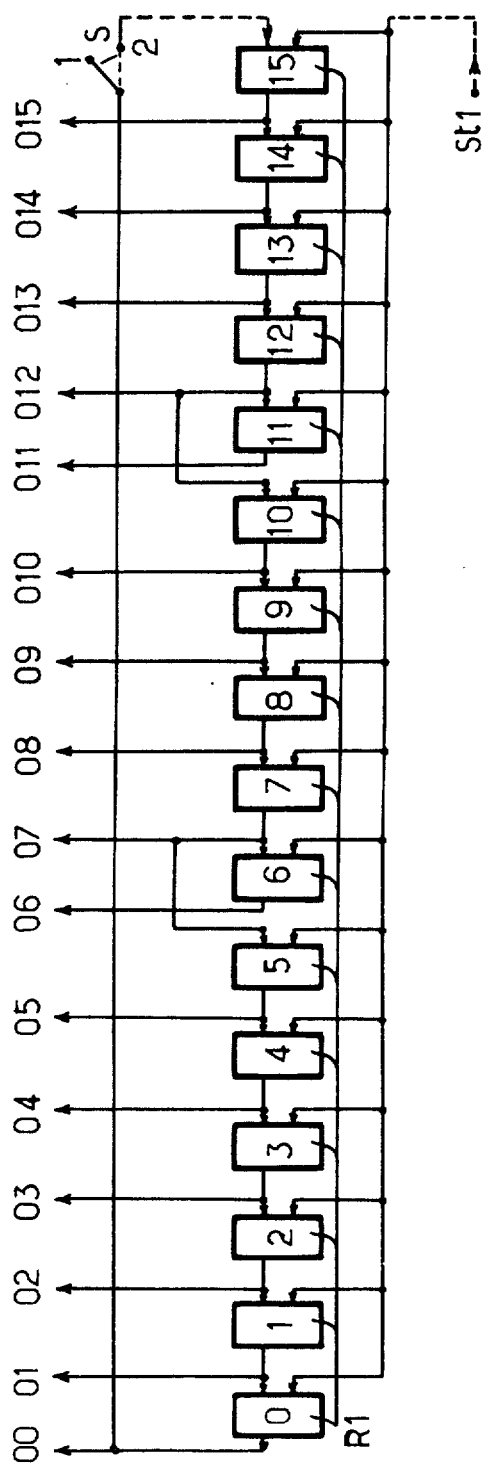
FIG. 4 is a diagram of a part of the group of registers for storing data, coded, and recordable by the chain printer whose coincidence of the characters with the hammers are listed in FIG. 3.

FIG. 4 illustrates a plurality of memories R1, numbered 0, 1, 2, 3, 4, 5, 6, 7, 8, 9, 10, 11, 12, 13, 14 and 15 which are identical shift registers, linked by the output to the recording elements 0, numbered 0, 1, 2, 3, 4, 5, 6, 7, 8, 9, 10, 11, 12, 13, 14, 15, respectively. Said recording elements include in the case of the described printer the hammers 0, 1, 2, 3, 4, 5, 6, 7, 8, 9, 10, 11, 12, 13, 14, 15, respectively of the first set. The registers 0, 1, 2, 3, 4 and 5 are connected in series, the first input of one register being connected with the output of the next. The same situation exists with the series of registers 6, 7, 8, 9, 10, the series of registers 11, 12, 13, 14, and 15, etc., when one passes from the first set of hammers to the following set. In contrary manner, the first input of the registers 5 and 6 is connected in parallel with the output of register 7. The same applies to the registers 10 and 11 connected in parallel with the register 12. This order of succession is found again in the other sets of hammers. The outputs of the register pulses are synchronized by a periodic signal transmitted by the terminal St1 in parallel with the second inputs of said registers. When, at a given initial instant while the registers are empty, one sends to the register 15 an initial coded data which in the present case is a coded character, the data contained in the register 15, at the end of a period equal to time of the signal sent by the terminal St1, will pass to the register 14 while the following data will be able to pass to the register 15, etc., until the initial data is in the register 0.

At this moment the fourteenth data is in register 15. This is due to the fact that the same data reaches the registers 10 and 11 in the same time and the same occurs for the registers 5 and 6.

When at a given moment the character of the row 0 is stored in the register 0 the characters of the rows 1, 2, 3, 4, 5, 5, 6, 7, 8, 9, 9, 10, 11, 12, 13, are stored in the registers 1, 2, 3, 4, 5, 6, 7, 8, 9, 10, 11, 12, 13, 14, 15, respectively. The characters are coded in such a way that when a pulse is sent to the first input of a register the passing of one character to the following character according to a range represented by a set is made to correspond with its change of state. The registers are linked to a source S of pulses by the position 1 which is adequate when it furnishes 140 pulses for each of the registers of the 10 sets to contain one coded data. The circuit-breaker of the source S is then put in position 2, thus placing the registers in a closed loop. In this manner one may by the mentioned connections of the registers, shown in FIG. 4, store consecutively in each register, for a time defined by the period of the signal originating from the terminal St1, the coded characters that the hammer to which the register is linked may strike.

Figure 5:
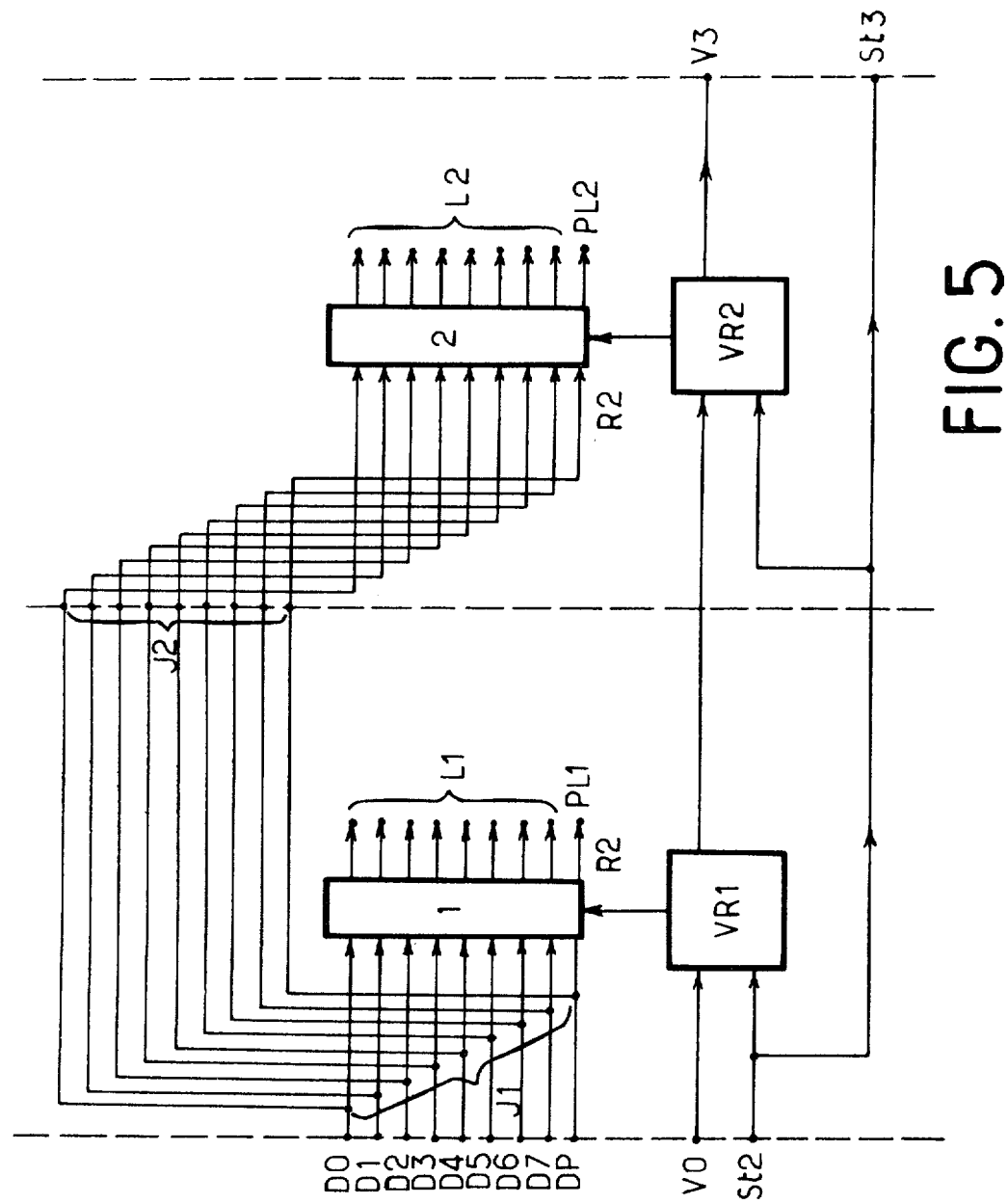
FIG. 5 illustrates the two memories for data, coded and to be printed consecutively by two recording elements of a chain printer, and their enabling circuits.

In the case in which the range of coded data to be recorded stems from the central unit of the computer to which the printer is linked and consists of a combination of 8 bits, the registers R1 for storage of a data are in 9 binary positions, the ninth position being reserved for a parity bit of the combination. FIG. 5 shows two registers 1 and 2 of the group of registers R2 which are used for the storage of coded data to be recorded. The input terminals D0, D1, D2, D3, D4, D5, D6, D7, and DP are connected in parallel to the 9 inputs of the registers 1 and 2, respectively. The terminal VO serves as input of an enabling signal and is linked to the first input of an enabling circuit VR1 of the register 1. The terminal St2 functioning as the input of a clock signal is connected in parallel with a terminal St3 and with the second inputs of the two enabling circuits VR1 and VR2. The circuit VR2 connected to the register 2 is identical with the circuit VR1, its first input being connected to the output of the circuit VR1. The output of the circuit VR2 is connected with a terminal V3. The outputs L1 of the register 1 and the outputs L2 of the register 2 are connected to the second inputs of the two comparators C of the two control circuits, respectively, as best shown in FIG. 1.

When the circuit VR1 receives an enabling signal from the terminal VO it enables the transfer of a pulse emitted by the terminal St2 to the register 1, while it inhibits transfer to the register 2. During the duration of the pulse originating from the terminal St2 the data present in the terminals D0, D1, D2, D3, D4, D5, D6, D7, and the parity in the terminal DP are stored alone in the register 1. After termination of that pulse, the circuit VR1 inhibits the transfer of any new pulse to the register 1 and enables transfer of the following pulse to the register 2 by enabling the circuit VR2. Thus, the storing of the following data and its parity is performed during the period of the pulse. The consecutive data originating in the computer must be printed in the chain printer in sequential columns corresponding with the order of position of the hammers. When, for instance, a data J0 has to be printed in the first column by the hammer 0 the following data J1 must be printed in the second column by the hammer 1. The absence of data corresponding with the location of one or several columns on the printing line entails the arrest of the hammers facing these columns. In the case where a data J1 is to be printed by the hammer 1, as in FIG. 5, it will be stored in the register 1 by the enabling circuit VR1. The data J2 will then be stored in the register 2 by the enabling circuit VR2, etc., for the total group of registers R2 for storage of the data to be printed.

Figure 6:
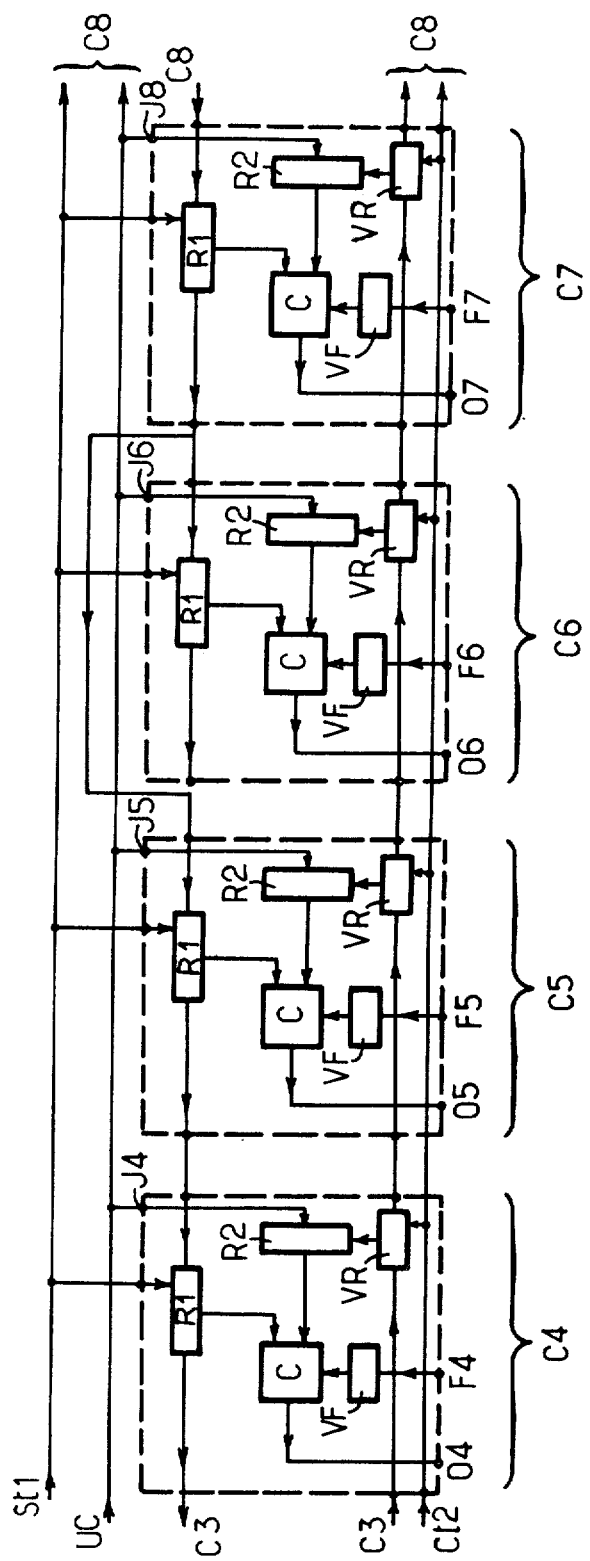
FIG. 6 is a diagram of control circuits associated with recording elements of a chain printer.

The circuits which make up the device for controlling the actuating media for the hammers of the chain printer each comprise: a register R1, a register R2, a comparator C, and an enabling circuit VF, for comparison as shown in FIGS. 1 and 6. The storage in the registers R1 is accomplished by the means already described and illustrated in FIG. 4, while it is effected in the registers R2 by the means described and illustrated in FIG. 5. In this manner the control circuits are connected with each other, as in FIG. 6 which exhibits the circuits C4, C5, C6, C7 of the control media for the striking of the hammers 4, 5, 6, 7 whose coincidences with the characters of the chain were given in FIGS. 2 and 3. The input of the register R1 of the circuit C7 is connected with the output terminal of register R1 of the circuit C8 and its output is connected in parallel with the inputs of the registers R1 of the circuits C6 and C5. The output of the latter register R1 is connected to the input of the register of circuit C4, whose output is linked to the input terminal of the register of circuit 3.

The signal St1 for the synchronization of the registers R1 stemming from the circuit C3 is transmitted in parallel to a second input of the registers R1, as illustrated in FIG. 6, before being sent to the circuit C8. The coded data, emitted by the central unit UC, are transmitted in parallel to a first input of the registers R2. The enabling circuits VR of the registers R2 are connected in series and each linked to a second input of the register R2, as already indicated in FIG. 5, to enable the storing in the registers R2 of the sequence of data J4, J5, J6, and J7 which are emitted by the central unit UC. The enabling circuits for comparison VF are connected with the terminals F4, F5, F6, and F7, respectively, of the enabling control. The output of each comparator is affiliated with an actuating medium of the hammer bby the terminals 04, 05, 06 and 07, respectively.

Figure 7:
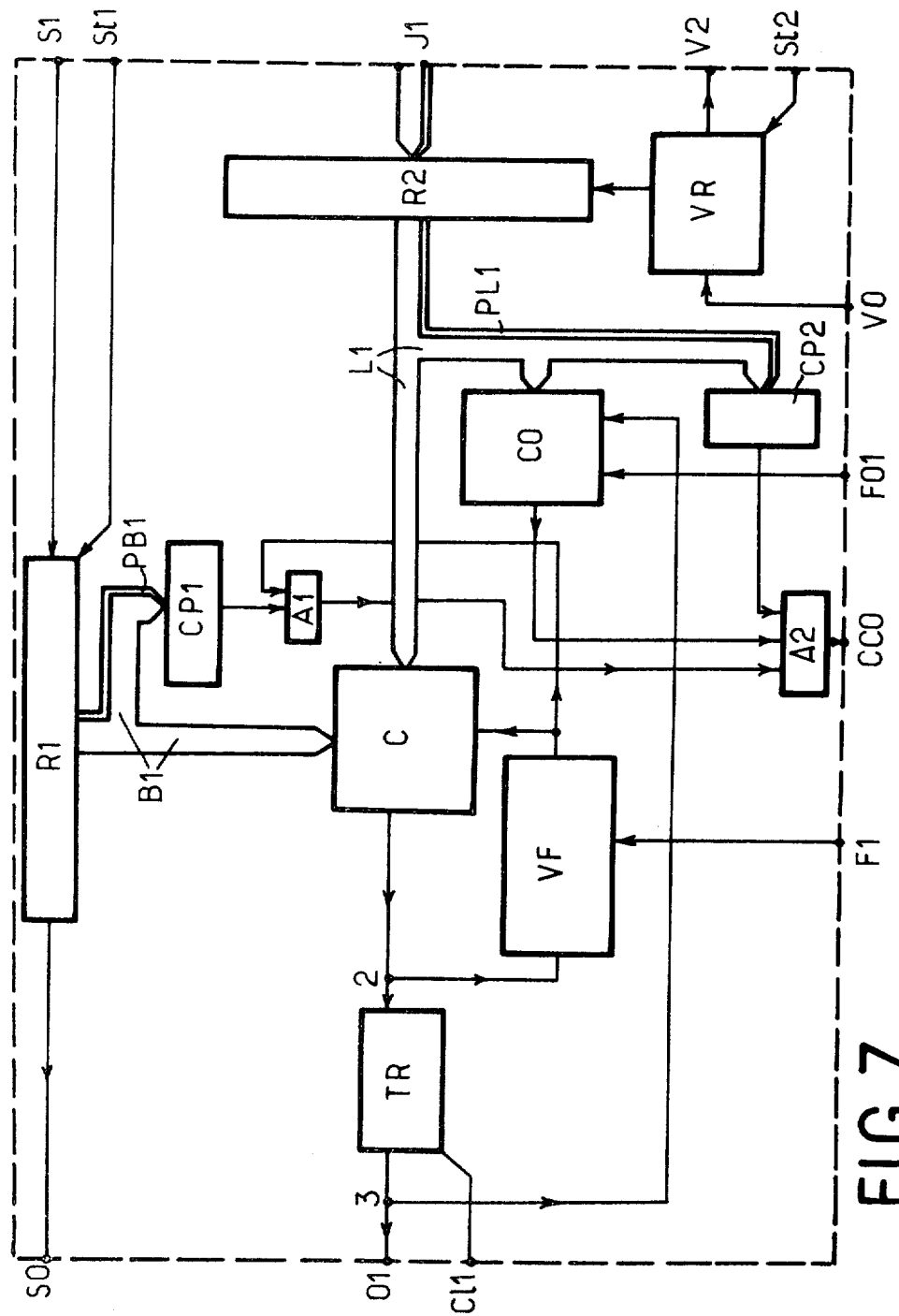
FIG. 7 is a detailed diagram of a control circuit of a recording element of a chain printer.

FIG. 7 is a detailed diagram showing an example of the embodiment of a control circuit C1 of a medium 01 for the setting of a hammer in motion, according to the invention. The register R1 is a shift register in series connected by its inputs to the terminals S1 and St1 and by a first output to the terminal SO. A data stored in the register R1 in the form of B1 of a combination of 8 bits is transmitted, on the one hand, to the comparator C through a second output, on the other hand, to the input of a parity-control input CPI which at the same time receives a ninth signal of parity PBI. The register R2 is a parallel register connected by a first input with an input terminal J1 for data coded in 8 bits plus 1 parity bit. The enabling circuit VR connects the terminals V0 and V2 and is connected by a second input to a terminal St2. The coded data L1 leaving the register R2 is transmitted, on the one hand, to second input of the comparator C, and on the other hand, to the input of a parity-control circuit CP2 which receives also a ninth parity signal PL1.

One of the enabling circuits for comparison VF is connected with a terminal F1 serving as the input of a selection signal for the sub-cycle of the hammer strike to which the circuit C1 is linked. It will be seen that the generator of this signal is also tied to 9 other terminals, equivalent to F1, of control circuits affiliated with the hammers of the same order in the 9 other sets. This generator is, for instance, a counter furnishing a series of 16 pulses, spaced from each other by a sub-cycle for the strike control of the group of hammers. The output of the comparator C is connected with the input of a counter TR for the transmitting of a signal to the medium by the terminal 01 within the time necessary for the control of the hammer. This time is defined by a signal used in the input terminal C11 which is connected to a second input of the counter TR. The AND gate, marked A1, whose first input is connected with the output of circuit CP1 and whose second input is linked to the output of circuit VF, provides at its output an indication of the detection of an error of parity in the data transmitted by the register R1 to the comparator, however, only during the time of authorization of the comparison. A signal is the output of the circuit CP2 also permits the detection of a parity error in the data transmitted by the register R2 to the comparator during the printing of a line on paper. The data L1 is sent to a first input of a strike-control circuit C0 whose second input is connected with the output 3 of the counter TR, the third input is linked with the terminal F01 in connection with the circuit of the medium 01 monitoring the effective occurrence of a strike. If the information L1 is data a combination of 8 signals is sent to the first input of the circuit C0. This circuit is designed in such a way that it emits a signal in its output only in the absence of one or two signals in the two other inputs to show that a strike was not ordered or carried out. If the information L1 is a space it is coded so that no signal is transmitted to the first input of the circuit C0. The latter is designed so as to furnish a signal at its output only in the presence of one or two signals in the two entries to indicate that a strike was ordered or performed by error. The output of circuit C0 as well as the outputs of the circuits A1 and CP2 are tied to the 3 inputs, respectively, of an OR gate (marked A2) for control of the circuit C1 whose output is linked to a terminal CC0. The output 2 of the comparator is tied to a second input of the enabling circuit VF for comparison to avoid, in the course of the printing of a line, the comparator sending a second signal to the counter in the case where a character is repeated in the same set.

The zero setting of the register R2, its enabling circuit VR, enabling circuit for comparison VF, the counter TR, and the control circuit C0, was not shown in FIG. 7 as the method for effecting such zero setting is considered to be known. The same applies to the zero setting of the register R1. The terminal CC0 may, for instance, be linked with a central control circuit of the printer as well as the terminals which are the equivalents of the other control circuits. The advantage of the central circuit lies in its capacity to spot defective control circuits in case of failure. It also allows fixing of the end of a hammer strike, and thereby the end of the strike for the printing of a line which may occur, in accordance with the data to be printed, before the 48 cycles required for the possible striking of 48 different characters by one hammer.

The detailed description of the control circuit C1 which has just been present with reference to FIG. 7 is applicable to any control circuit for actuation of a hammer. It was designed especially for a chain printer, but is not confined to that example. If one considers the entire group of identical circuits which constitutes the control device for an aggregate of recording elements, only the outer connections of these circuits, especially their assemblage in relation to each other, are predicated on the data to be recorded and on the recording elements to accomplish it.

The description just given refers to a type of embodiment of a control device according to the invention for use with a large number of elements for the rapid recording of data. The importance of the invention is especially due to the identity of the control circuits and their relatively simple outer connections. The properties of the circuits according to the invention permit their manufacture in series, their relatively simple installation, and thus a saving of time resulting in a considerable reduction of the cost of the device. Notably, these circuits may be produced in the form of integrated-circuit modules, each consisting of one or several regrouped control circuits.

The control device according to the present invention may profitably be applied to other means of recording than the electro-mechanical media referred to in this description. According to the type of recording support one could, for instance, visualize electro-optical or electro-acoustical media. The recording may also be of a temporary nature, in which case the device may have applications in the fields of switching and addressing.

What is claimed is:

1. In a control system including a plurality of recording elements each capable of recording successive characters of a unique sequence of characters at respected discrete time intervals during a time period, said time period being divided into a plurality of cycles and said recording elements being grouped into sets such that each recording element of a given set has the capability of recording once and at a unique discrete time interval during a given cycle, the unique discrete time interval respective to one recording element within a given set being different from the unique discrete time interval respective to any other recording element within the same given set; a plurality of control circuits, one for each recording element, each control circuit being effective to cause a given recording element to record a desired character of said unique sequence within said time period, each control circuit comprising in combination:

first memory means having an output for producing, in response to successive enabling signals, said successive characters of said unique sequence at said discrete time intervals during said time period;

second memory means having an output during said time period, which output corresponds to said desired character, said second memory means each including an enabling circuit for causing said second memory means to be updated with a new desired character, said enabling circuits being interconnected so as to effect successive updating of each of said second memory means;

comparison means connected to the outputs of said first and second memory means for producing an output signal when said first memory means produces a character which matches said desired character as indicated by said second memory means, each of said comparison means including a further enabling circuit which enables the output signal of said comparison means only during its respective unique discrete time intervals; and further means connected to said comparison means and responsive to said output signal of said comparison means so as to actuate said given recording element causing it to record said desired character.

2. In a control system as defined in claim 1 wherein each first memory means comprises a shift register of sufficient size as to indicate any character in said unique sequence.

3. In a control system as defined in claim 2 including, within said first memory means, switch means for interconnecting said shift registers in a closed loop and for connecting one of said shift registers to a source for serially reading data into said one register.

4. In a control system as defined in claim 3 wherein each of said second memory means comprises n memory elements for indicating said desired character and means for updating said desired character, said means for updating being connected in parallel to said n memory elements.

5. In a control system as defined in claim 2 wherein each of said second memory means comprises n memory elements for indicating said desired character and means for updating said desired character, said means for updating being connected in parallel to said n memory elements.

6. In a control system as defined in claim 1 wherein each of said second memory means comprises n memory elements for indicating said desired character and means for updating said desired character, said means for updating being connected in parallel to said n memory elements.

7. In a control system as defined in claim 1 wherein each first memory means comprises a shift register of sufficient size as to indicate any character in said unique sequence, certain of said shift registers being connected in series and certain others thereof being connected in parallel so as to cause each of said first memory means to produce said unique sequence.

8. In a control system as defined in claim 7 including within each first memory means switch means for interconnecting said shift registers in a closed loop and for connecting one of said shift registers to a source for serially reading data into said one.

9. In a control system as defined in claim 8 wherein each of said second memory means comprises n memory elements for indicating said desired character and means for updating said desired character, said means for updating being connected in parallel to said n memory elements.

10. In a control system according to claim 1 including, for each recording element, a first control circuit connected to the output of the first memory means and a second control circuit connected to the output of the second memory means, each of said control circuits acting to produce a signal which indicates that a coded data in the output of one of said memory means is erroneous.

* * * * *